(12) United States Patent
Luo et al.

(10) Patent No.: US 7,463,757 B2
(45) Date of Patent: Dec. 9, 2008

(54) TOOTH LOCATING WITHIN DENTAL IMAGES

(75) Inventors: Jiebo Luo, Pittsford, NY (US); Mark R. Bolin, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 995 days.

(21) Appl. No.: 10/731,231

(22) Filed: Dec. 9, 2003

(65) Prior Publication Data

US 2005/0123180 A1    Jun. 9, 2005

(51) Int. Cl.
 G06K 9/00    (2006.01)
 A61C 19/10   (2006.01)
 A61C 5/00    (2006.01)

(52) U.S. Cl. .................... 382/128; 433/26; 433/215

(58) Field of Classification Search ................ 382/128, 382/129, 130, 131, 132, 133, 134; 433/9, 433/18, 26, 40, 68, 136, 139, 149, 170, 175, 433/178, 181, 191, 192, 194, 202.1, 204, 433/205, 206, 219; 378/168, 191
See application file for complete search history.

(56) References Cited

U.S. PATENT DOCUMENTS

| | | | | |
|---|---|---|---|---|
| 5,083,920 | A * | 1/1992 | Molteni et al. ............... 433/72 |
| 5,901,245 | A | 5/1999 | Warnick et al. |
| 5,961,324 | A | 10/1999 | Lehmann |
| 6,132,210 | A * | 10/2000 | Lehmann .................... 433/26 |
| 6,190,170 | B1 * | 2/2001 | Morris et al. ............... 433/215 |
| 6,206,691 | B1 * | 3/2001 | Lehmann et al. ............ 433/26 |
| 6,305,933 | B1 | 10/2001 | Lehmann |
| 6,328,567 | B1 * | 12/2001 | Morris et al. ............... 433/215 |
| 6,358,047 | B2 | 3/2002 | Lehmann |
| 6,384,917 | B1 * | 5/2002 | Fradkin ...................... 356/402 |
| 7,234,937 | B2 * | 6/2007 | Sachdeva et al. ............ 433/24 |
| 2002/0021439 | A1 | 2/2002 | Priestley et al. |
| 2003/0143509 | A1 * | 7/2003 | Kopelman et al. ........... 433/24 |

FOREIGN PATENT DOCUMENTS

WO    WO 03/083765 A1    10/2003

OTHER PUBLICATIONS

B. van Ginneken et al.; "A non-linear gray-level appearance model improves active shape model segmentation" 2001 IEEE, pp. 205-212.
Digital Image Processing, R.C. Gonzalez and R. E. Woods, pp. 458-461, Addison—Wesley Publishing Company, (1992).
Active Shape Models—Their Training and Application, Cootes et al, Computer Vision and Image Understanding, vol. 61, No. 1, pp. 38-59, (1995).

(Continued)

Primary Examiner—Abolfazl Tabatabai

(57) ABSTRACT

In a method, computer program, and system a dental target, such as a tooth, is located within a digital dental image. A reference object that was placed in the patient's mouth is segmented within a digital dental image to provide a segmented reference. The reference object has a predetermined size dimension. A window is segmented in the dental image at the position of the dental target. The segmented reference defines the relative size and location of the window, prior to the segmenting of the window.

6 Claims, 8 Drawing Sheets

OTHER PUBLICATIONS

Contemporary Esthetics and Restorative Practice, Aug. 2003, vol. 7, No. 8 "The Use of Digital Photography, Shade Mapping Technology,a nd Proper Laboratory Communication to Achieve Predictable Shade Matching for Anterior Restorations" pp. 24-33.

ProWest—ShadeScan by Cynovad (http://www.prowestdentallab.com) 4 pages, printed out Dec. 5, 2003.

Shofu Dental Corporation—ShadeEye NCC from Shofu Dental Corporation, (http://www.shadeeye.com), 2 pages, printed out Dec. 5, 2003.

Shade Scanning Synopis—Synopis of Shade-Scanning Units, 6 pages, (http://brookfs.af.mil/dis/DIS68/shadescan.htm), Printed out Dec. 4, 2003.

ClearMatch, Dentist and Laboratory Shade Communication Softare, 3 pages, http://www.smart-technology.net/Clearmatch.htm, printed out Dec. 5, 2003.

Welcome to CYNOVAD, ShadeScan,ShadeWhite, Mapping the Shades . . . With A Single Click!, 4 pages, (http://www.cynovad.com/shadescan_p.htm), printed out Mar. 8, 2004.

Sullivan-Schein Dental, X-Rite Shade Vision System, 2 pages, (http://www.sullivanschein.com), printed out Mar. 8, 2004.

X-Rite ShadeVision System, X-Rite ShadeVision System Quick Guide, 1 page, (http://www.shadevision.com), printed out Mar. 8, 2004.

X-Rite ShadeVision System, X-Rite ShadeVision System, Good Targeting, 3 pages, (http://www.shadevision.com), printed out Mar. 8, 2004.

* cited by examiner

TOOTH LOCATING WITHIN DENTAL IMAGES

CROSS REFERENCE TO RELATED APPLICATIONS

Reference is made to commonly assigned U.S. patent application Ser. No. 10/460,693 filed Jun. 12, 2003 entitled "A Dental Color Imaging System", in the names of Edward Giorgianni and Alexander Forsythe, which is hereby incorporated herein by reference.

FIELD OF THE INVENTION

The invention relates to digital image processing of dental images and more particularly relates to tooth locating within dental images.

BACKGROUND OF THE INVENTION

Modern dental procedures often involve the fabrication of restorations such as crowns, implants, fixed partial dentures, and veneers. Ceramics are often used in such restorations because their optical properties are such that skillfully produced ceramic restorations can closely match the shape, texture, color and translucency of natural teeth.

Producing such realism involves a considerable degree of skill. Tooth color, texture, and translucency vary not only from patient to patient, but also from tooth to tooth in an individual patient and within a single tooth. Teeth vary in shape over a wide range. Information regarding the color and other appearance characteristics of a patient's teeth needs to be accurately determined and unambiguously conveyed to those who will be fabricating the restoration. While molds and other techniques can be used to record and transfer information regarding tooth shape and other geometric characteristics, techniques for determining and conveying color and other appearance characteristics are more problematic.

The most widely used techniques for determining and communicating tooth color information have changed little in the past seventy years. Typically, the process (referred to as "shade matching") involves visually matching a patient's tooth to one of a number of reference shade samples (shade tabs) within one or more sets of standardized shade guides. The person performing the match, often a dentist, records the identification of the matching shade tab and conveys that information to the dental laboratory where the restoration will be fabricated. The laboratory then uses its own set of the same shade guides to perform visual color evaluations of the restoration throughout the fabrication process.

The visual shade matching process has a number of problems: The initial matching procedure is often long, difficult, and tedious. It is not unusual for the process to take twenty minutes or longer. In most cases, there will be no shade tab that perfectly matches the patient's teeth. Deciding which tab matches most closely (i.e., which mismatches the least) is often problematic. Visual color evaluation of relatively small color differences is always difficult, and the conditions under which dental color evaluations are made are likely to give rise to a number of complicating psychophysical effects such as local chromatic adaptation, local brightness adaptation, and lateral-brightness adaptation. Frequently, the dentist will determine that the patient's teeth are particularly difficult to match. The patient then must go in person to the orthodontics laboratory that will be fabricating the restoration. There, trained laboratory personnel can perform the color match. In many cases, the patient will have to return to the dentist and laboratory two, three, or even more times as the color of the prosthesis is fine tuned by sequential additions of ceramics or other colored materials.

The difficulties associated with dental color matching have led to the development of systems that attempt to replace visual assessments with those determined by various types of spectrophotometric and colorimetric instruments. U.S. Pat. Nos. 6,358,047, 6,305,933, 6,206,691, 6,132,210, and 5,961,324, to Lehmann et al., describe a tooth shade analyzer system in which the preferred embodiment is based on the use of an intra-oral camera providing red, green, and blue (RGB) color values that are subsequently normalized and then used to derive hue, saturation, and intensity (HSI) values using a single set of RGB-to-HSI conversion equations. The derived HSI values are then compared to those derived from corresponding RGB measurements taken of a collection of shade tabs.

U.S. Pat. Nos. 6,190,170 and 6,328,567, to Morris et al., describe a system that uses two or more references to normalize RGB image values from one or more digital cameras. Similarly, U.S. Pat. No. 6,384,917, to Fradkin, describes a system that uses beam splitters and other optical components to obtain RGB image values. Once again, teeth and shade tabs are compared according to their RGB values or to HSI or other values derived from RGB values using a single set of conversion equations. U.S. Patent Application Publication No. US2002/0021439A1, to Priestley et al., also describes a color matching system in which colors are analyzed in terms of RGB values.

The cross-referenced U.S. Patent Application by Giorgianni and Forsythe, uses multiple subject-specific colorimetric transformations in a dental shade-matching system. Each colorimetric transformation is based on one specific subset of colors (e.g., natural teeth, shade tabs, prosthetic ceramics, etc.). Additionally, colorimetric calibration is provided for each individual camera, each individual set of shade tabs, and each individual intra-oral reference. The system uses a two separate lighting arrangements to minimize or eliminates specular reflections within the area of measurement, and produce images that accurately convey supplemental information such as tooth texture, gloss, and other details. An intra-oral reference is used that has optical properties designed to be well correlated with those of natural teeth. In the system, a shade tab database is built using images of shade tabs photographed with artificial gums and with a background that simulates the human mouth. A standardized set of shade-tab colorimetric values and a corresponding set of computer-generated shade tab images are provided, which can serve as a standard for determining and communicating color specifications. Decision algorithms automatically determine the closest shade-tab match to one or more areas of a specified tooth. The degree of match is indicated in terms of a numerical values, and/or graphical representations, and/or corresponding verbal descriptions. Matching is based on comparisons of regions of interest that are selectable in number and location. Shape and color recognition algorithms simplify and/or fully automate the user task of locating and sizing regions of interest. Optionally, the matching is also determined for any number of other shade tabs in the database, and the results are listed in rank order. The decision algorithm of the system includes parameters that can be adjusted to correspond with various shade-tab selection preferences and objectives. Multiple sets of parameters values, each corresponding to the preferences of a particular user or situation, can be stored and selected for use. An on-screen visual comparison pairs the measured tooth and a selected shade tab. The system provides for visualization of a proposed prosthesis within an image of the patient's mouth. A simulated prosthetic image is created using geometric and other information, from an image of a patient's tooth or from another source, together with colorimetric information derived from the proposed matching shade tab. The system provides a monochrome mode for evaluating lightness, one or more enhanced-chroma modes for evaluating hue, and a mode that simulates the effects of increased viewing distance and squinting. Procedures are provided for measuring a completed prosthesis to either verify that its color meets specifications or, if not, to quantify the color changes required to meet those specifications. A procedure is provided for mapping and compensating for lighting non-uniformity.

A critical feature of a computerized dental color imaging system is locating the tooth of interest. This can be done manually by positioning a small sensor close to a tooth. This approach is cumbersome at handling differences in color and other characteristics within a single tooth. Alternatively, an image can be captured with the tooth of interest centered in the image. This approach is dependent upon the skill of the user. As another alternative, an image can be presented on a computer display and the tooth of interest can be identified by a user input, such as clicking a mouse button when the cursor is over the tooth of interest. This approach tends to be tedious for the user and, thus, prone to errors.

Pixel-based, edge-based, region-based, and model-based segmentation techniques are well known in digital image processing. Each approach has its own limitations. For example, pixel-based segmentation techniques tend to be difficult to apply with complexly shaded and colored objects. Region-growing techniques are subject to critical errors when adjoining objects closely match an object of interest.

It would thus be desirable to provide an improved dental target locating method and apparatus, in which segmentation is automatic and is relatively insensitive to variations in lighting conditions and target color and shape.

SUMMARY OF THE INVENTION

The invention is defined by the claims. The invention, in broader aspects, provides a method, computer program, and system, in which a dental target, such as a tooth, is located within a digital dental image. A reference object that was placed in the patient's mouth is segmented within a digital dental image to provide a segmented reference. The reference object has a predetermined size dimension. A window is segmented in the dental image at the position of the dental target. The segmented reference defines the relative size and location of the window, prior to the segmenting of the window.

It is an advantageous effect of the invention that an improved dental target locating method and apparatus is provided, in which segmentation is automatic and is relatively insensitive to variations in lighting conditions and target color and shape.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
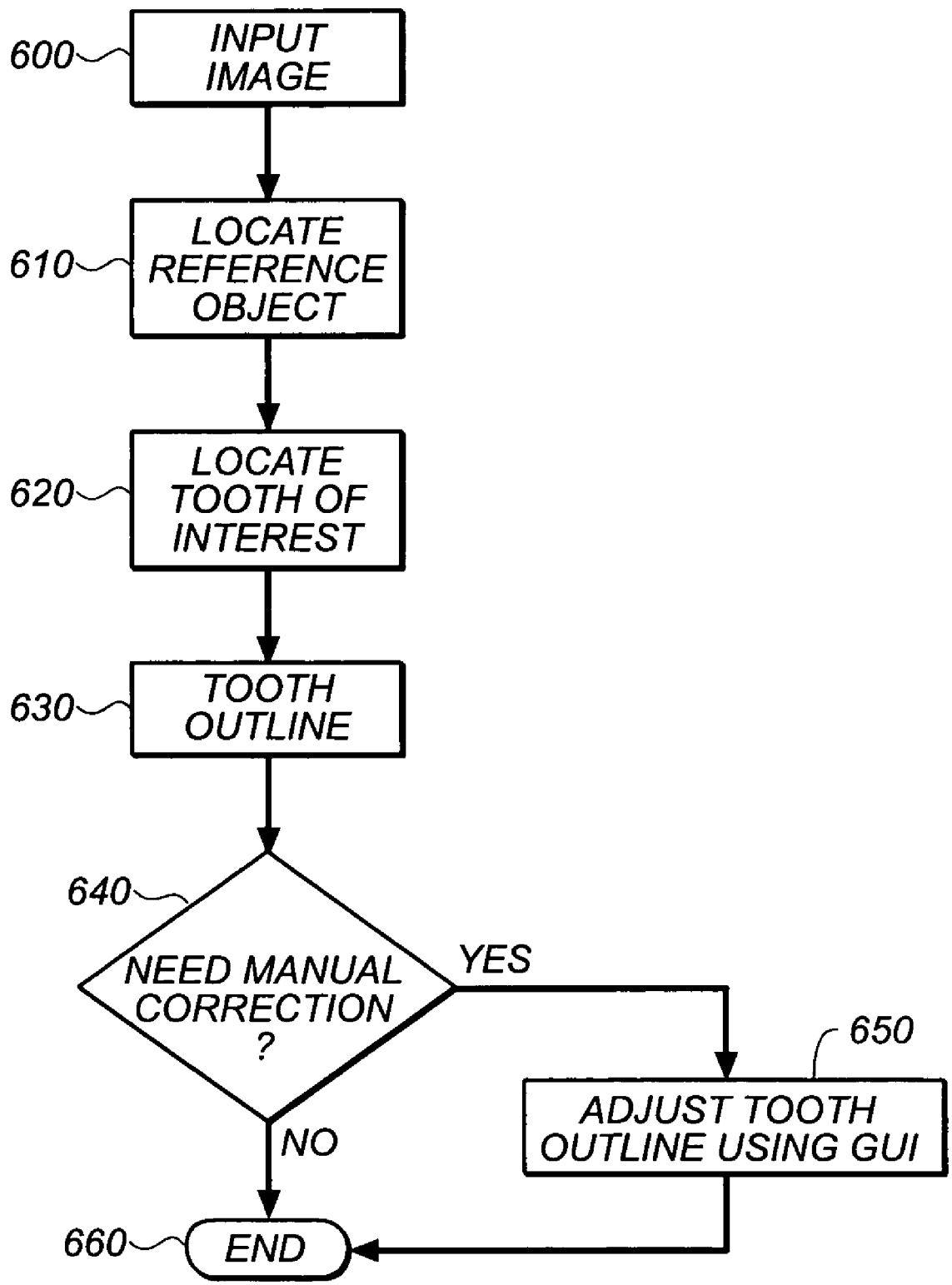
FIG. 1 is a block diagram illustrating the main features of an embodiment of the method.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. For convenience, these signals as sometimes referred to herein in relation to the underlying information using referents such as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to systems including specific pieces of apparatus for performing the operations described herein. Apparatus such as a programmable computer may be specially constructed for the required purposes, or may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic- optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods. The structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

References to "in a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The invention is thus inclusive of combinations of the embodiments described herein.

The term "dental target" is used here to refer to a single tooth of interest or, in the rare situation, to a group of teeth considered as a single object. "Dental target" is also inclusive of equivalent prostheses. For convenience discussion here is generally limited to teeth. It will be understood that like considerations apply to prostheses and combinations of teeth and prostheses.

The term "dental image" is used herein to refer to an image that shows a patient's mouth including a dental target and one or more additional teeth and/or prostheses.

Elements not specifically shown or described herein may be selected from those known in the art. Certain aspects of the embodiment to be described may be provided in software. Given the method as shown and described according to the invention in the following materials, software not specifically shown, described or suggested herein that is useful for implementation of the invention is conventional and within the ordinary skill in such arts. The method of the invention is useful with, but not limited to use with dental color image processing procedures well known to those of skill in the art.

Referring now to FIG. 1, in the method, the reference object is placed in a patient's mouth, such that the reference object defines a start location on the dental target. An image of the reference object and dental target is then captured and digitized to provide a digital dental image. The input dental image is processed to locate the reference object (610) and a dental target (620). In the embodiment shown in the figures, the dental target is a tooth of interest.

The processed image is displayed to the operator along with a window (630), which is conveniently shown as an outline around the located tooth. The operator is given an opportunity to verify that the image is acceptable or to provide user input that indicates an adjustment of the window. Alternatively, the locating method can terminate without manual inspection and correction. This approach can be used in a batch processing mode. The processed image and window are next saved for use in shade matching or another procedure.

The reference object is configured so as to be readily detected in the dental image and easily handled by the practitioner. In particular embodiments the reference object is bitable, that is, the reference object is configured such that the patient can bite upon the reference object to hold the reference object in a required orientation. Suitable materials for this purpose are well known to those of skill in the art. The reference object has one or more predetermined size dimensions that are utilized in the locating method. In the embodiments shown in the figures, the reference object used is a rectangular-shaped, uniformly colored block. The reference object has a rectangular front face having a known length and width. The ratio of length to width is 3 to 1. The front face is flat and has a uniform tone-scale value. A more complexly configured reference object can be utilized, but such complexity is unnecessary for the procedures discussed here and could be a source of error. Multiple reference objects of different sizes can be utilized, but this required the practitioner to identify the reference object used, or requires use of an automatically recognizable identification feature (such as a different length to width ratio), or the like.

Figure 5A:
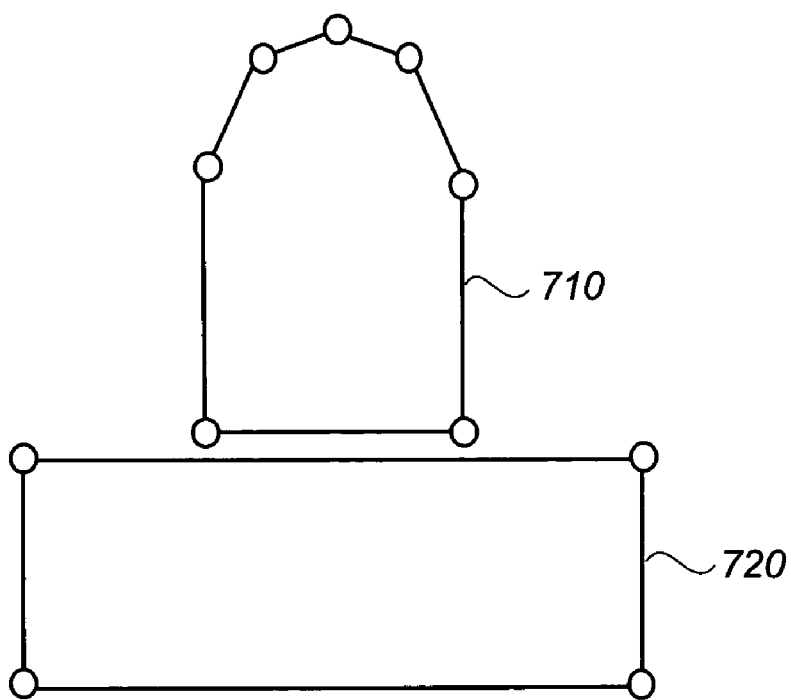
FIGS. 5A-5B are diagrammatical illustrations of two active shape models usable in the method of FIG. 1.
Figure 5B:
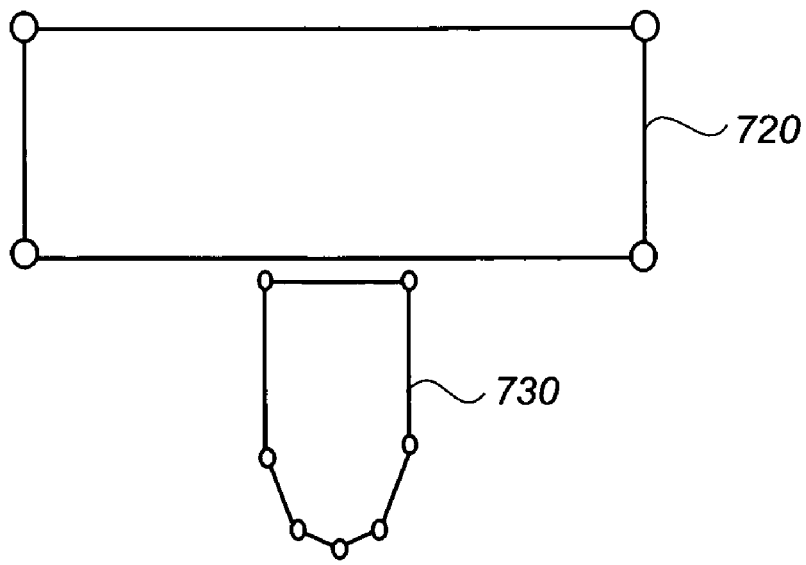
Figure 6:
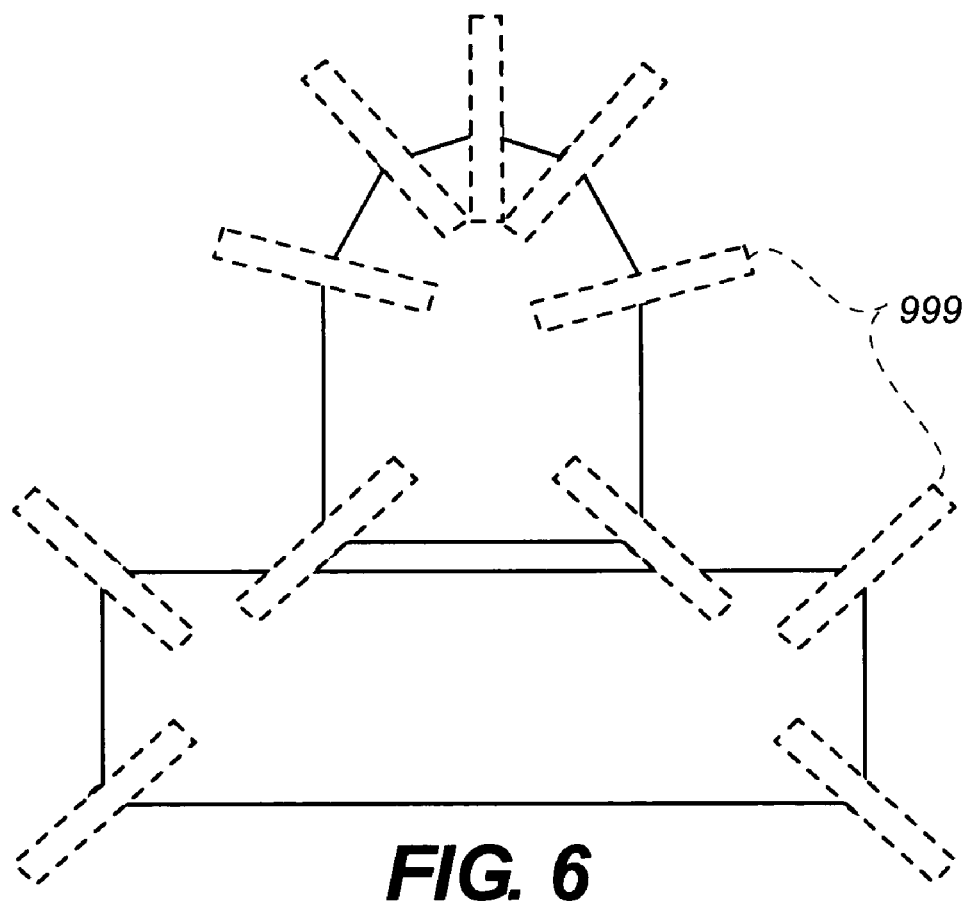
FIG. 6 is a diagrammatical illustration of the search window of the active shape model of FIG. 5A.
Figure 7:
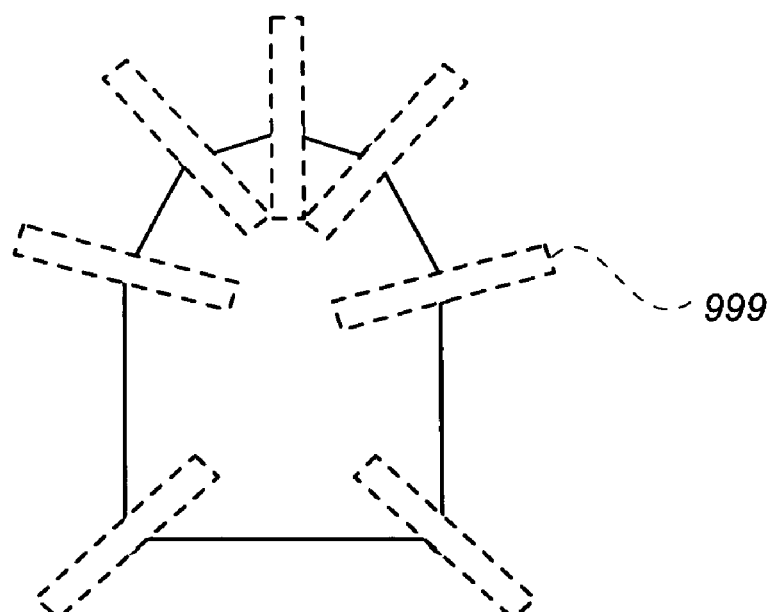
FIG. 7 is a diagrammatical illustration of the search window of a modification of the active shape model of FIG. 5A.

The reference object defines a start location on the dental target when the dental image is captured. The start location is set by the practitioner, by positioning a locating feature of the reference object in a predetermined relationship to the dental target. A simple locating feature and simple relationship of that feature to the dental target are preferred for ease of use. In the embodiments of FIGS. 5A-6, the locating feature is an imaginary line parallel to the transverse edges of the reference object at the longitudinal center of the reference object. In the embodiments of FIGS. 7A-7B, the locating feature is the right edge of the reference object. ("Right" refers to the relative position in the dental image.) These embodiments require a user input as to whether the dental target is above or below the locating feature. An alternative approach is user of a locating feature in the form of a discontinuity or marking on the reference object or use of a reference object having different length longitudinal edges. With this approach the orientation of the reference object can be recognized so as to identify whether the dental target is above or below the locating feature.

The start location on the dental target is at a predetermined distance from the reference object in a direction defined by the locating feature. This takes into account any gap between the dental target and the locating feature of the reference object due to tooth geometry or the like. Since the size of one or more dimensions of the reference object are known, the distance and direction, referred to herein as the "initializing vector", can be appropriately scaled in the dental image.

Figure 2:
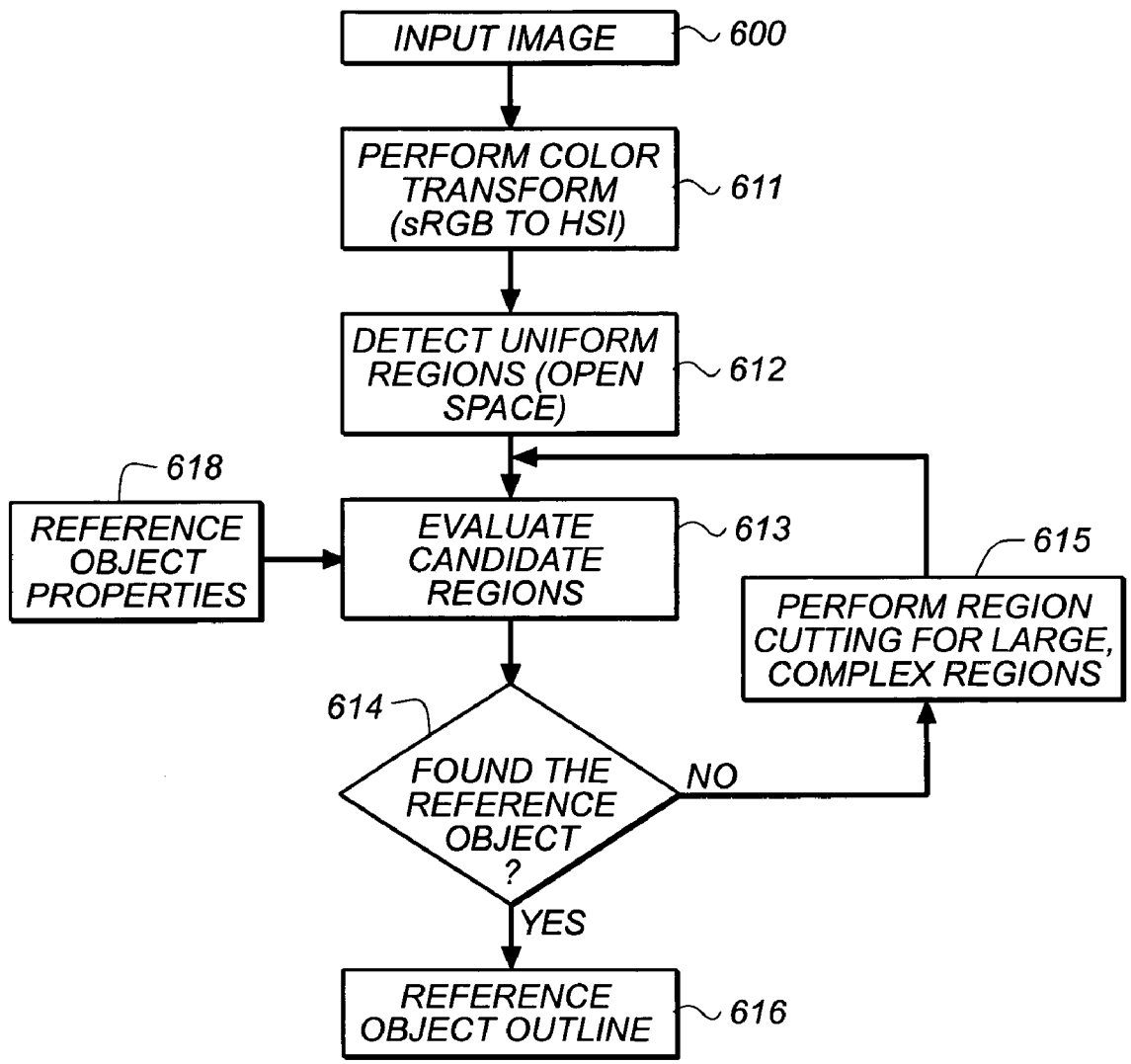
FIG. 2 is a block diagram illustrating steps, in the method of FIG. 1, for locating the reference object.

The reference object is segmented in the dental image to provide a segmented object. The segmentation procedure used can be one of a variety of pixel-based, edge-based, region-based types of segmenting methods. Referring to FIG. 2, in a particular embodiment, the input digital image (600) is first converted from sRGB metric to HSI metric (611) using a proper color transform well known in the art where HSI stands for Hue-Saturation-Intensity (See Gonzalez and Woods, Digital Image Processing, pp. 229-235, Addison-Wesley, 1992).

$$I=(R+G+B)/3$$

$$S=1-3*\min(R,G,B)/(R+G+B)$$

$$H=\cos-1\{0.5*[(R-G)+(R-B)]/[(R-G)2+(R-B)(G-B)] 1/2\}$$

Next, uniform or smooth regions are detected (612) in the preferred color metric of HSI although other alternative color metric including sRGB itself can be used. A region detection procedure disclosed in U.S. Pat. No. 5,901,245, to Warnick et al., is used for detecting smooth regions. Alternative smooth region detection procedures known to those of skill in the art can also be used. The procedure of U.S. Pat. No. 5,901,245 detects open space in a digital image. The term "open space" as used herein, refers to one or more completely bounded areas of an image, in which color and spatial properties appear visually uniform. In the procedure, an activity map of a digital image is created, a determination is made as to which pixels in the activity map are below a threshold, and open space is designated as contiguous pixels of the activity map having values below the predetermined threshold.

Referring again to FIG. 2, spatially contiguous smooth regions, that is, open space regions, are evaluated (613) to check for pre-determined properties of the reference object (618) in the open space regions (614). A useful property of a uniform reference object is a particular tone scale value or range of values that take into account non-uniformities of the capture process. If the reference object is not found after the above steps, an additional step is used to perform region cutting for large regions of complex shapes (615). This may be necessary if the reference object closely matches neighboring teeth, such that the open space region initially detected includes both the reference object and one or more touching teeth.

A manual input can be required at this stage to identify a portion of the open space region that includes the reference object. Alternatively, the reference object can be configured to avoid this occurrence. As another alternative, it is known that there is one and only one reference object in the image; thus, a region cutting process can be used to decompose a large open space region into multiple subregions that can then be evaluated in the same manner as the earlier regions.

The final result of segmenting the reference object (616) is a segmented object (627) (also referred to as the detected reference object), shown in the figures as an outline. With the rectangular reference object of the illustrated embodiments, the segmented object is fully defined by the spatial coordinates of the corners of the front face.

Figure 3:
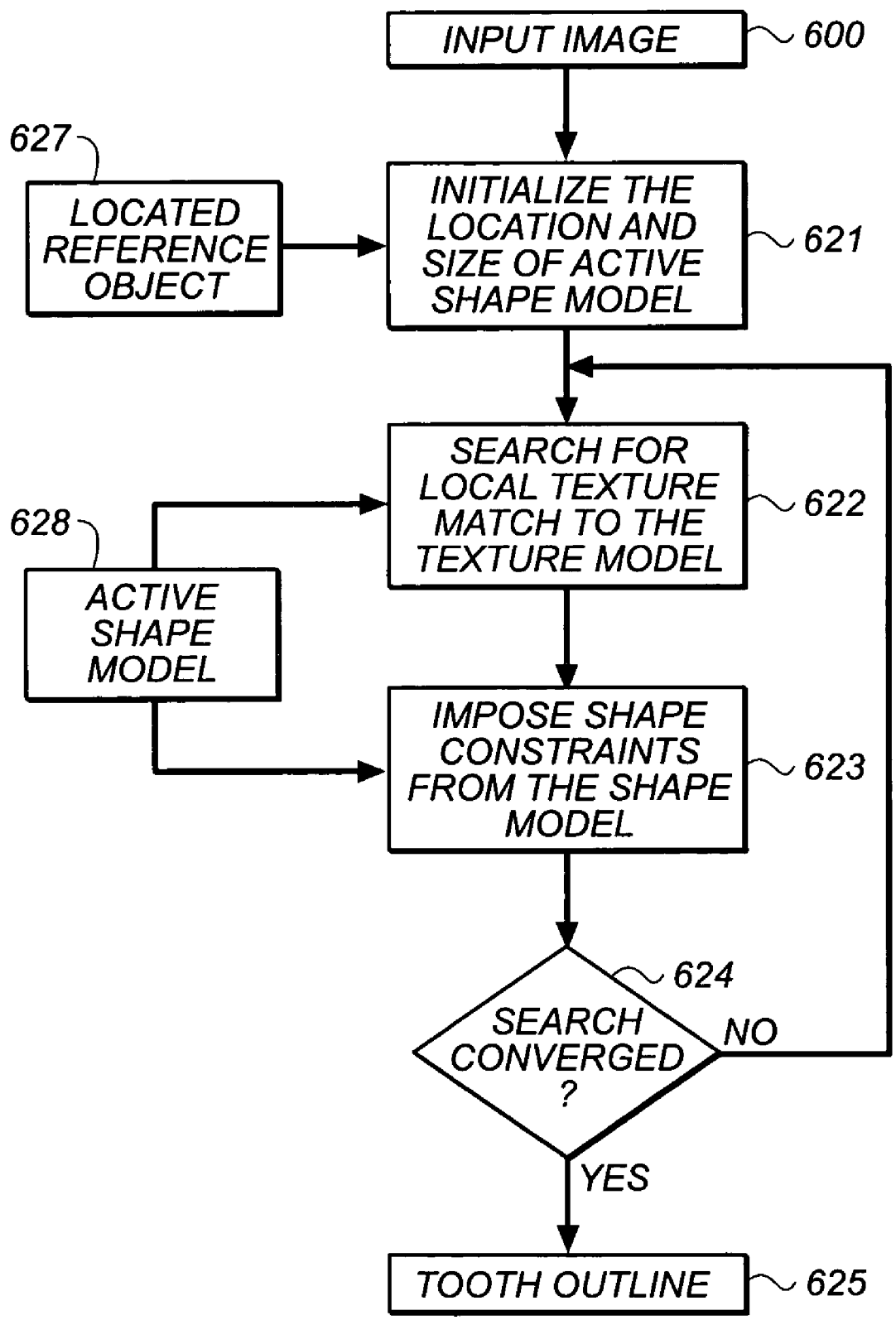
FIG. 3 is a block diagram illustrating the steps, in the method of FIG. 1, of searching for the tooth or other dental target.

Referring now to FIG. 3, within the input image (600), the location and size of the detected reference object (627) is used to set (621) the initial location and size of the dental target for an active shape model (ASM). As earlier described, a position is searched from the locating feature of the reference object along the initializing vector to the start location.

Alternatively, an operator can define the location and size of the dental target by manually providing spatial coordinates of at least two nodes of said window to said active shape model. This can be done by clicking a button of a mouse with the cursor positioned over the dental target or by designating a dental target by tooth number, or the like.

A window that includes the start location is then segmented in the dental image. The window is the size of the dental target. Different segmenting procedures known to those of skill in the art, can be applied here, such as pixel-based, edge-based, region-based, and model-based segmentation procedures.

In view of the complicated subject matter, tooth shapes, active shape model segmentation procedures are preferred. Active shape models (ASM's) can effectively take into account both the shape and structure ("texture") of an object through statistical learning of the variation in the shape and texture of the class of modeled objects. Consequently, a properly trained ASM is robust to noise, geometric distortion, and color variation. In comparison, simple segmentation methods such as region growing are sensitive to the above factors even if an operator provides a starting point ("seed") for region growing because there is no mechanism to constrain the shape of the region; frequently region growing would spill to neighboring objects with similar color (e.g., other teeth, the reference object, or the gum). Region growing is also sensitive to the threshold used to control the growing process and in general a fixed threshold cannot deal with the color variations from image to image.

An example of an active shape model is disclosed in "Active Shape Models—Their Training and Application," Cootes et al., *Computer Vision and Image Understanding*, Vol. 61, No. 1, pp. 38-59, (1995). An example of region growing segmentation applicable to such an active shape model is disclosed in *Digital Image Processing*, Gonzalez and Woods, pp.458-461, Addison-Wesley, (1992).

The active shape model technique of the Cootes et al. article determines the locations of feature points by performing a series of local searches for positions with matching textural appearance, with constraining of the results based on a global model of plausible shapes. Texture and shape models are integrated. This is a convenient feature for dental imaging.

A texture model is constructed for every feature point. Gradient profiles are calculated for each RGB color channel within a specified window. The major axis of this window is oriented normal to the connections between feature points. The gradients are normalized by dividing by their mean magnitude and combined into a single vector t. The appearance vectors from the set of examples are used to compute the mean appearance vector $\bar{t}$ and the covariance matrix $S_t$ for each feature point. The Mahalanobis distance is used to measure the similarity of a texture (t) to the model, i.e., $$f(t)=(t-\bar{t})^T S_t (t-\bar{t})$$

A model of the global shape of the features is created from a principal components analysis of the annotated examples. The feature locations of the examples are aligned and arranged into 1-dimensional coordinate vectors. An ordered list of the most significant axes of shape variation is given by the unit eigenvectors $V_k$ such that $$Sv_k = \lambda_k v_k$$

where S is the covariance matrix for the coordinate vectors and $\lambda_k$ is the kth eigenvalue and $\lambda_k \geq \lambda_{k+1}$. The eigenvalues indicate the variance of the examples along the corresponding eigenvector. The majority of the shape variation can typically be explained with relatively few of the primary axes. A convenient simplification is retaining only the M most significant axes that encapsulate 99% of the shape variation. The final model consists of the mean shape ($\bar{x}$), the primary axes ($v_k$), and their expected ranges ($\sqrt{\lambda_k}$).

The shape model constrains the results of the local searches to positions that form a plausible global shape. The current feature locations are aligned with the mean shape and projected into the principal components subspace using $$b = V^T (x - \bar{x})$$

where V is the matrix of the first M eigenvectors and b is a vector of shape coefficients for the primary axes. The shape coefficients are then limited to a multiple of their expected ranges and the transformations are inverted.

Continuing with FIG. 3, the ASM is initialized (621) in the preferred embodiment by aligning the mean position of the nodes in the training examples (810) with the location and size of the located reference object (627) using the shape nodes that indicate the reference object (720). A search process is then performed to find the match between the ASM and local image structures in terms of texture (622) and shape (623) according to the trained ASM (628). The local neighborhoods around each node are investigated to find the positions that best matches the texture model (830). The resulting positions are then constrained to form a plausible shape using the shape model (820). This process repeats until the positions of the nodes converge upon a stable result (624). The final outline of the tooth is generated (625) consisting of the spatial coordinates of the corners ("nodes") of the ASM.

The ASM needs to be designed with expert knowledge of the segmentation task, e.g., the characteristics of the object and the background clutter. In a particular embodiment, two ASMs shown in FIGS. 5A-5B are used. Each ASM includes the reference object and the dental target. FIG. 5A is for an upper tooth, where the tooth of interest (710) is above the reference object (720). FIG. 5B is for a lower tooth, where the tooth of interest (730) is below the reference object (720). The main reason to have two ASMs for upper and lower teeth is that an ASM, once trained, are not easily transconfigurable (e.g., to handle vertical flipping).

As earlier discussed, the appropriate ASM can be selected by operator input or use of an appropriately configured reference object. Either way, the vertical positioning of the tooth relative to the reference object can be determined. In addition, for teeth other than the front ones, it may be necessary to either train the ASM using examples of these teeth, or train different ASMs for teeth that are significantly different in their shape (e.g., the canines).

The ASM can have the reference object and the tooth grouped together or can be limited to only the tooth. In this case, the relative position and the relative size of the tooth with respect to the reference object would need to be encoded and specified in some other way, for example, by using heuristic rules. It would also be necessary to provide manually the spatial coordinates of at least two nodes for the active shape model of the tooth in order to provide the initial position and size of tooth for the active shape model.

An ASM consists of nodes. In general, nodes should be placed on the points of large curvature, i.e., corners, on the outline of the object because such corners characterize a shape, as shown in FIGS. 5A-5B. In addition, it is also advantageous to place nodes where the contrast between the interior and exterior of the object is expected to be large because that is where the texture characteristics are most separable. As shown in FIG. 6, narrow rectangular boxes 999, drawn in dotted lines, are placed such that they are centered at the nodes and oriented along the normal direction of the object outline. These boxes are used to analyze the texture characteristics of the interior and exterior of the object. For example, in general, the interior side of a each box is expected to be bright (corresponding to tooth color) while the exterior side of a box can be dark (for gaps between teeth) or red/pink (for gum) depending on the location of the box. The active shape model encodes such texture characteristics as probability distributions (derived from the training stage, as described below).

Figure 4:
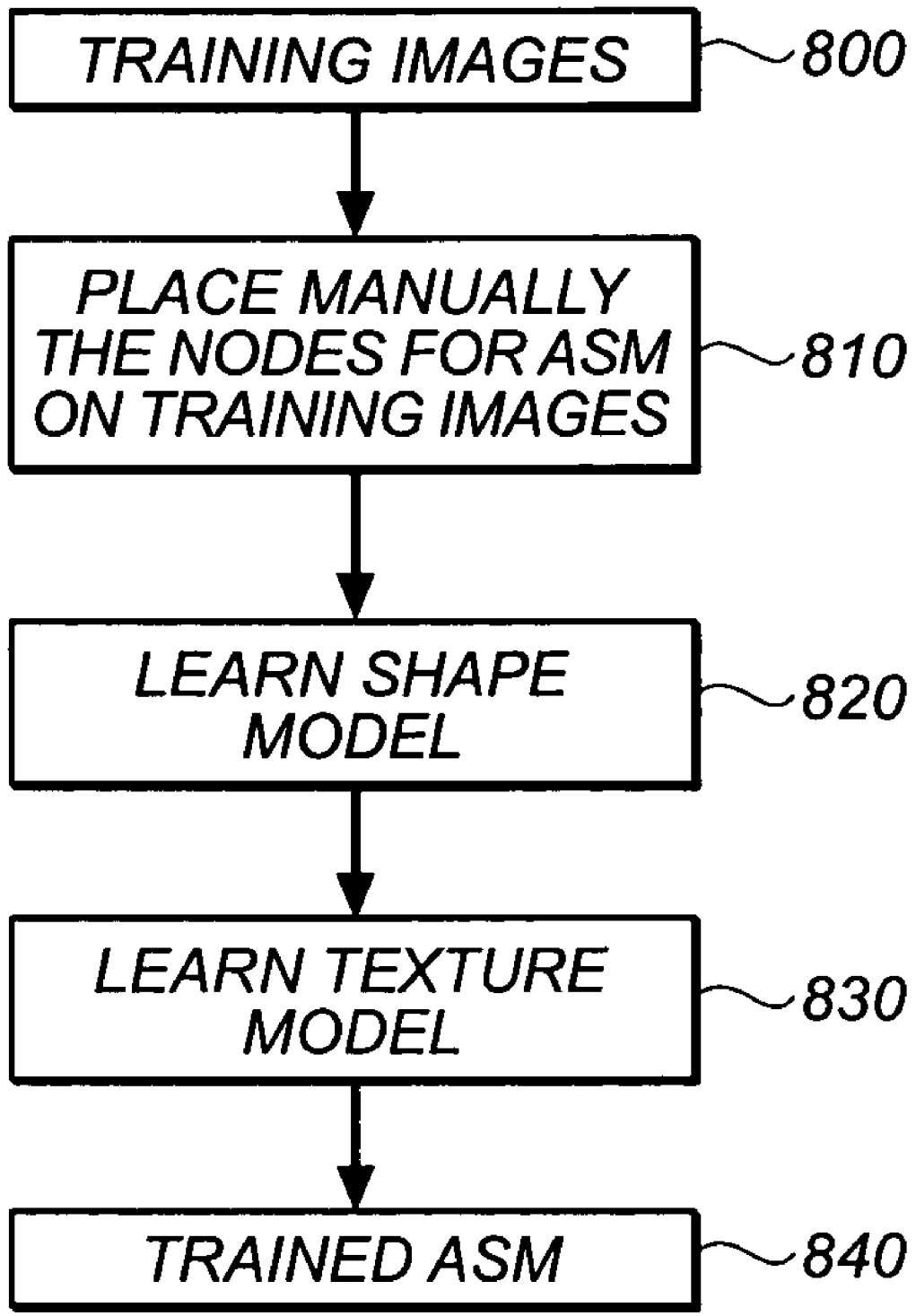
FIG. 4 is a block diagram illustrating the steps of training the active shape model used in the method of FIG. 1.

Once the topology of an ASM is determined, the ASM needs to be parameterized through a training procedure illustrated in FIG. 4. A sufficient number of training images (800) need to be collected. In general, the more nodes an ASM consists of, the more training images are needed to adequately train the ASM. During the training process, an operator needs to place manually the same nodes defined in the ASM on the targets in the training images (820). From the operator-marked training images, the relative spatial relationships among the nodes are learned to form the shape model (820), while at the same time the color variations near the nodes are learned to form the texture model (830). It is preferred to form a multi-resolution texture model by using a series of boxes of different sizes in order to encode texture properties at different scales. After being presented with various examples, the trained ASM model (840) learns to cope with normal variations in terms of color, texture and shape.

FIGS. 7A-7B show an example of the process of locating the reference object. First, uniform colored regions are detected in FIG. 7A, where a spatially contiguous region is marked by the same brightness value. Because the reference object is merged with a cluster of teeth in the same smooth region, the initial attempt for locating the reference object fails. Next, the region cutting procedure is invoked to separate the reference object from the cluster of teeth and the results are shown in FIG. 7B. Since the reference object is already separated, the evaluation process successfully located the reference object, as shown by the brightest region in FIG. 7C.

Figure 8A:
FIGS. 8A, 8B, and 8C are semi-diagrammatical illustrations of an example of the steps of locating the reference object in the method of FIG. 1.
Figure 8B:
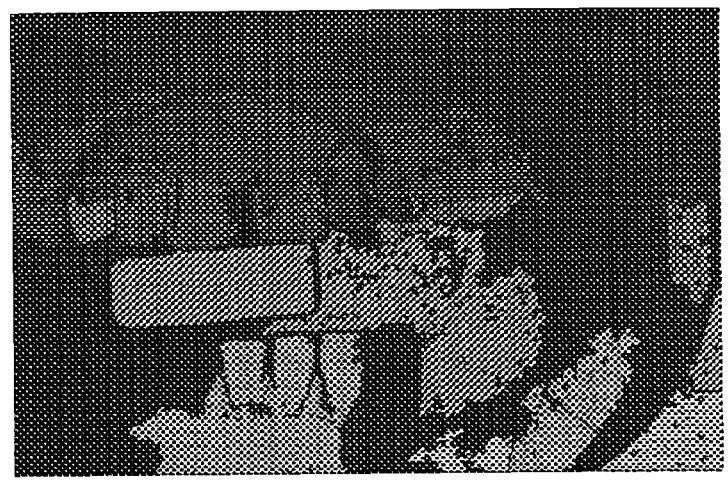
Figure 8C:
Figure 9A:
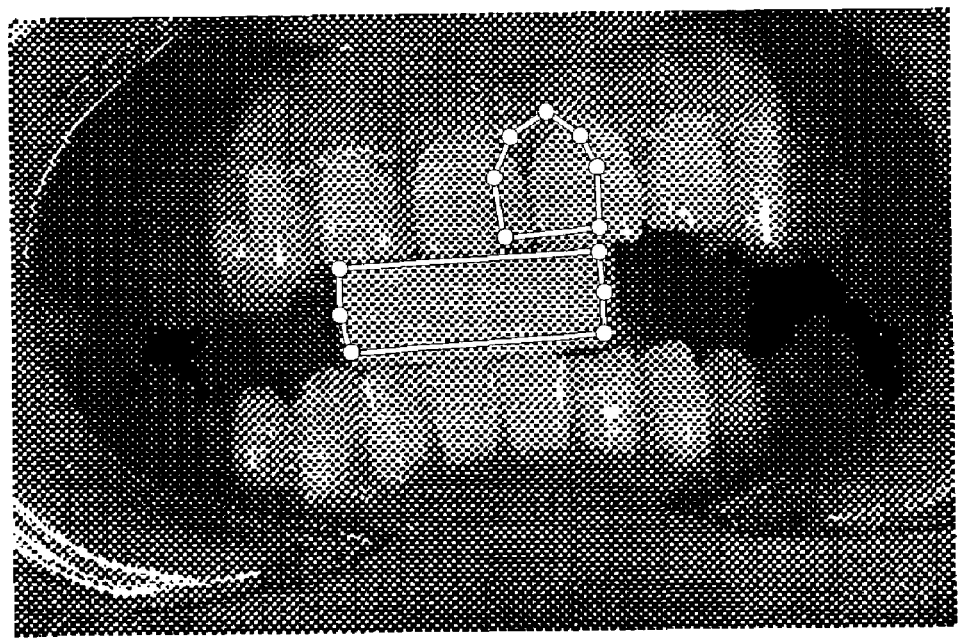
FIGS. 9A and 9B are semi-diagrammatical illustrations of an example showing the initial and final positions of the active shape model using the method of FIG. 1.
Figure 9B:
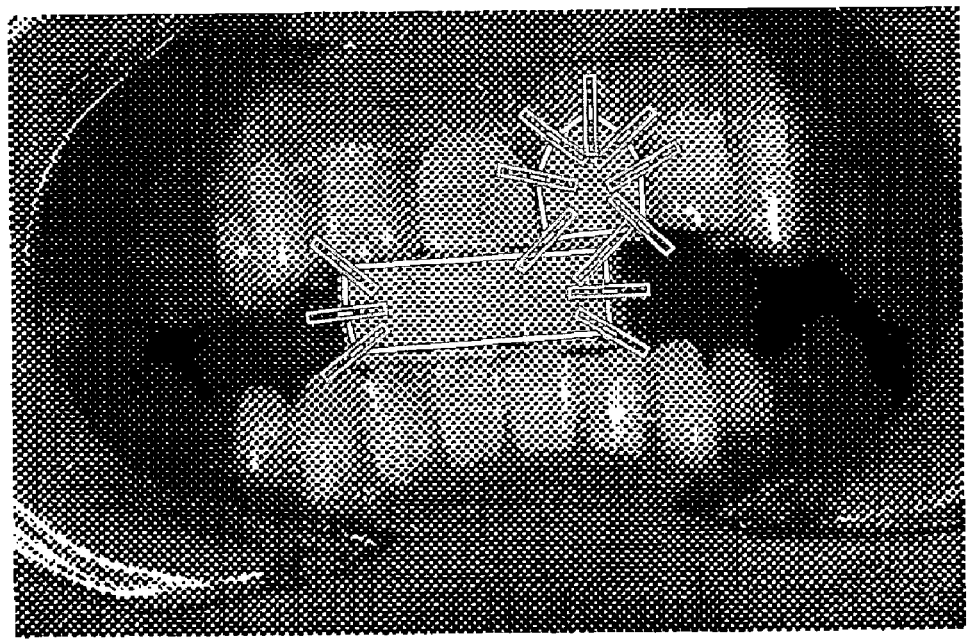

FIG. 8A shows an example of the process of locating a tooth of interest. First, the nodes of the ASM, properly resized based on the size of the detected reference object, are placed in the input digital image as shown in FIG. 8A. Note that the initial positions of the nodes related to the tooth are still far from the accurate because they are simply based on the average relative position derived (automatically) during training. FIG. 8B shows the final positions of the ASM nodes after the search is converged. Note that the tooth nodes, shown in white circles, are now accurately placed on the tooth. The texture search boxes are also shown in gray rectangles in FIG. 8B. The spatial coordinates of the tooth nodes are then passed on to the subsequent stages of the dental shade matching system.

The present invention may be implemented for example in a computer program product. A computer program product may include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The system of the invention includes a programmable computer having a microprocessor, computer memory, and a computer program stored in said computer memory for performing the steps of the method. The computer has a memory interface operatively connected to the microprocessor. This can be a port, such as a USB port, over a drive that accepts removable memory, or some other device that allows access to camera memory. The system includes a digital camera that has memory that is compatible with the memory interface. A photographic film camera and scanner can be used in place of the digital camera, if desired. The system also includes a bitable reference object, as earlier described. A graphical user interface (GUI) and user input unit, such as a mouse and keyboard can be provided as part of the computer.

The invention has been described in detail with particular reference to certain preferred embodiments thereof, but it will be understood that variations and modifications can be effected within the spirit and scope of the invention.

What is claimed is:

1. A method for locating a dental target within a digital dental image, said method comprising:

automatically segmenting a reference object within a digital dental image to provide a segmented reference, said reference object having a predetermined size dimension, wherein said segmenting of said reference object includes:

transforming said dental image from a red-green-blue color space to a hue-saturation-intensity color space;

detecting uniformly colored, spatially-contiguous regions of said dental image; and determining if one of said regions has properties matching predetermined properties of said reference object;

segmenting a window in said dental image;

defining the size and location of said window relative to said segmented reference prior to said segmenting of said window.

2. The method of claim 1 wherein said segmenting further comprises, following said determining:

stopping said evaluating when said properties match;

cutting one or more of said regions into subregions when said properties of each of said regions and said predetermined properties of said reference object are mismatched; and determining if one of said subregions has properties matching predetermined properties of said reference object.

3. A computer program product for locating a dental target within a digital dental image, said product comprising: a computer readable storage medium having a computer program stored thereon for performing the steps of:

segmenting a reference object within a digital dental image to provide a segmented reference, said reference object having a predetermined size dimension, wherein said segmenting of said reference object includes;

transforming said dental image from a red-green-blue color space to a hue-saturation-intensity color space;

detecting uniformly colored, spatially-contiguous regions of said dental image; and determining if one of said regions has properties matching predetermined properties of said reference object;

segmenting a window in said dental image;

defining the size and location of said window relative to said segmented reference prior to said segmenting of said window.

4. A dental shade matching system comprising:

a programmable computer having a microprocessor, computer memory, a computer program stored in said computer memory for performing the steps of:

segmenting a reference object within a digital dental image to provide a segmented reference, said reference object having a predetermined size dimension, wherein said segmenting of said reference object includes;

transforming said dental image from a red-green-blue color space to a hue-saturation-intensity color space;

detecting uniformly colored, spatially-contiguous regions of said dental image; and determining if one of said regions has properties matching predetermined properties of said reference object;

segmenting a window in said dental image;

defining the size and location of said window relative to said segmented reference prior to said segmenting of said window, said computer having a memory interface operatively connected to said microprocessor;

a digital camera having memory operatively connectable to said memory interface; and a bitable reference object.

5. A dental shade matching system comprising:

a programmable computer having a microprocessor, computer memory, a computer program stored in said computer memory for performing the steps of:

segmenting a reference object within a digital dental image to provide a segmented reference, said reference object having a predetermined size dimension, wherein said reference object has a rectangular front face, said front face having a size and shape identified in said program;

segmenting a window in said dental image; and defining the size and location of said window relative to said segmented reference prior to said segmenting of said window, said computer having a memory interface operatively connected to said microprocessor;

a digital camera having memory operatively connectable to said memory interface; and a bitable reference object.

6. The system of claim 5 wherein said front face has a uniform tone-scale value.

* * * * *